(12) United States Patent  (10) Patent No.: US 8,328,497 B2
Wood  (45) Date of Patent: Dec. 11, 2012

(54) GRAIN CART WITH CONTAINER HAVING A PIVOTABLE SIDE WALL EXTENSION PANEL

(75) Inventor: James E. Wood, Ft. Recovery, OH (US)

(73) Assignee: J. & M. Manufacturing Co., Inc., Fort Recovery, OH (US)

( * ) Notice: Subject to any disclaimer, the term of this patent is extended or adjusted under 35 U.S.C. 154(b) by 90 days.

(21) Appl. No.: 12/925,226

(22) Filed: Oct. 15, 2010

(65) Prior Publication Data

US 2012/0093622 A1   Apr. 19, 2012

(51) Int. Cl.
*B60P 1/42* (2006.01)
(52) U.S. Cl. ..................... 414/526; 296/26.15
(58) Field of Classification Search .................. 414/526, 414/527, 528; 296/26.14, 26.15
See application file for complete search history.

(56) References Cited

U.S. PATENT DOCUMENTS

| | | | | |
|---|---|---|---|---|
| 669,876 A | * | 3/1901 | Critchlow | 414/520 |
| 2,585,169 A | * | 2/1952 | Potter | 414/505 |
| 3,648,859 A | * | 3/1972 | Johnson | 414/327 |
| 5,170,947 A | * | 12/1992 | Houle et al. | 239/657 |
| 5,203,662 A | * | 4/1993 | Theurer et al. | 414/339 |
| 5,340,265 A | | 8/1994 | Grieshop | |
| 5,380,142 A | * | 1/1995 | Hornung et al. | 414/491 |
| 6,296,435 B1 | | 10/2001 | Wood et al. | |
| 7,134,830 B2 | | 11/2006 | Wood | |

\* cited by examiner

*Primary Examiner* — Saul Rodriguez
*Assistant Examiner* — Jonathan Snelting
(74) *Attorney, Agent, or Firm* — Jacox, Meckstroth & Jenkins

(57) ABSTRACT

A grain cart includes a wheel supported frame supporting a container having front and rear walls connected by an inclined left side wall and an inclined right side wall. An auger conveyor has a lower section having an inlet to receive grain from the container and an upper section pivotable between a storage position adjacent the container and an extended discharge position projecting laterally outwardly from the cart. A side wall extension panel is pivotally connected to the inclined right side wall of the container and is movable from a retracted position projecting above the right side wall and an inclined extended position projecting laterally outwardly from the right side wall beyond a right support wheel. A set of inclined brace members are pivotally connected to the extension panel and are adjustably connected to a corresponding set of horizontal tie members rigidly connecting the side walls of the container.

11 Claims, 2 Drawing Sheets

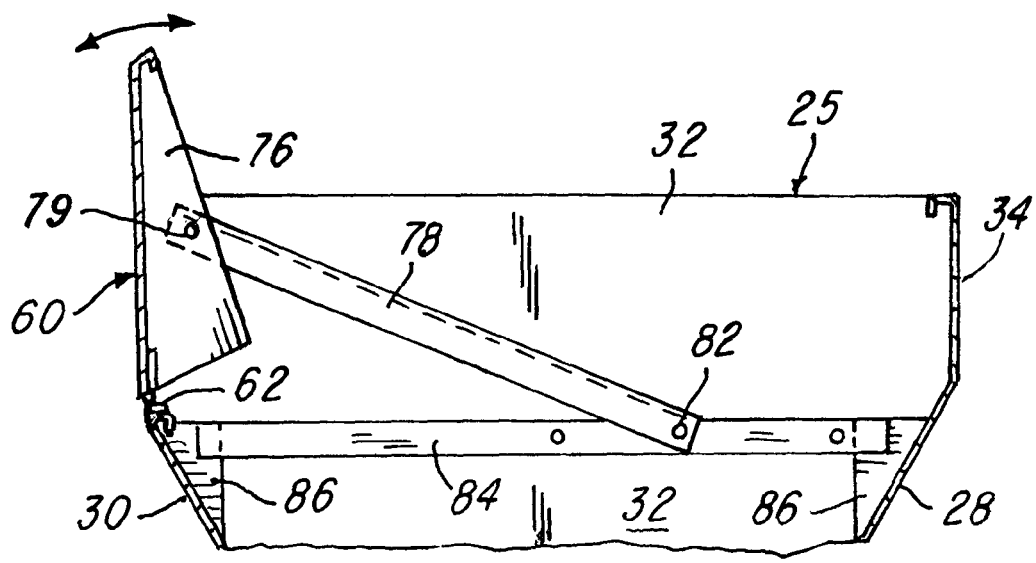

GRAIN CART WITH CONTAINER HAVING A PIVOTABLE SIDE WALL EXTENSION PANEL

BACKGROUND OF THE INVENTION

The present invention relates to a grain cart or wagon having a hopper or container with a discharge auger conveyor and of the general type disclosed in U.S. Pat. No. 5,340,265, U.S. Pat. No. 6,296,435 and U.S. Pat. No. 7,134,830 which issued to the assignee of the present invention. In such a grain cart or wagon, herein referred to as a grain cart, it is desirable to have an overall width no greater than 12 feet and an overall height under 13 feet in order to provide for conveniently transporting the grain cart along a roadway or on a semi-trailer without removing wheels or obtaining a special wide-load road permit which is costly, time consuming to obtain and requires at least one escort vehicle. It is also desirable for the grain cart to accept grain from an auger projecting from a combine having a wide crop gathering head, for example, up to 40 feet wide and while the cart is moving along side the moving combine.

Commonly, the grain transfer auger on the combine is not long enough to reach much further than the grain gathering head on the combine and into the container of the cart by a distance which provides for desirable load distribution of the grain within the container, especially while the cart is traveling along side the combine during transfer of grain from the combine to the cart container. If the cart is pulled by the tow tractor close to the combine, there is a likelihood that the wheels on the grain cart will collide with the combine gathering head. While some grain cart manufacturers have produced grain carts with side board extensions secured to the top of the grain cart container side walls, the carts have an overall width greater than 12 feet and/or an overall height which is too high to accommodate the discharge auger on many existing combines in order to fill the cart container properly.

SUMMARY OF THE INVENTION

The present invention is directed to a grain cart of the type disclosed in the above mentioned patents and having an improved grain container which provides the above desirable features of maintaining the desirable overall height and width of the grain cart during shipping while also providing a large grain capacity and accommodating combines having wide grain gathering heads. In accordance with the invention, the grain cart container includes an elongated right side wall extension panel which is pivotally connected to an upper portion of the inclined right side wall of the container. The extension panel is pivotable between a retracted position projecting above the inclined right side wall of the container and an inclined extended position projecting laterally outwardly from the upper portion of the inclined right side wall of the container. A set of releasable brace assemblies are spaced at intervals between the front wall and the rear wall of the container and support the extension panel in its inclined extended position and preferably also in its retracted position.

Other features and advantages of the invention will be apparent from the following description, the accompanying drawings and the appended claims.

BRIEF DESCRIPTION OF THE DRAWINGS

FIG. 3 is a fragmentary vertical section of the container similar to FIG. 2 and showing the right side wall extension panel in a retracted position.

DESCRIPTION OF THE ILLUSTRATED EMBODIMENT

Figure 1:
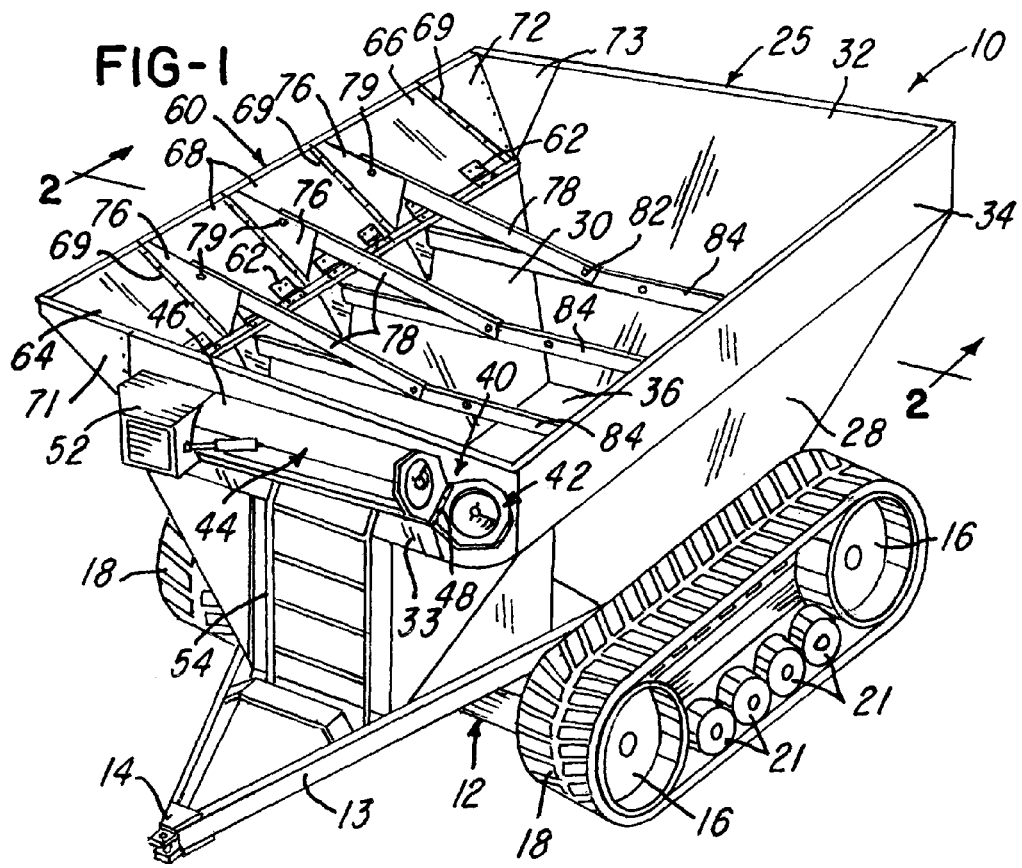
FIG. 1 is a perspective view of a grain cart having a grain receiving container with a right side wall extension panel constructed and supported in accordance with the invention.

FIG. 1 shows a grain cart 10 constructed in accordance with the present invention and having a general construction similar to the grain carts disclosed in U.S. Pat. No. 5,340,265, U.S. Pat. No. 6,296,435 and U.S. Pat. No. 7,134,830 which issued to applicant's assignee and the disclosures of which are herein incorporated by reference. The grain cart 10 has a support frame 12 including a forwardly projecting tongue 13 with a hitch 14 adapted to be attached to a tow vehicle such as a tractor. The frame 12 is supported by a set of wheels 16 which may be a single wheel on each side of the frame or dual or multiple wheels which may receive an endless flexible track 18 backed up at the bottom by a set of smaller wheels 21, as shown in FIG. 1.

The frame 12 supports a hopper or container 25 fabricated of sheet metal and having an inclined left side wall 28, an inclined right side wall 30, an inclined rear wall 32 and an inclined front wall 33, as shown in the above-mentioned patents. The left side wall 28 has a vertical extension wall portion 34, and all of the inclined walls slope downwardly to a bottom wall 36 which slopes to a grain receiving zone, as also shown in the above patents.

The grain cart 10 has an elongated auger conveyor 40 having a power driven helical auger and includes a lower auger section 42 having an inclined cylindrical housing with an inlet adjacent the grain receiving zone. The conveyor 40 also includes an upper auger section 44 having a cylindrical upper housing 46. The upper auger section 44 is pivotally connected to the lower housing section 42 by a hinge 48 which permits the upper section 44 of the auger conveyor 40 to pivot or fold between a stored position, as shown in FIG. 1, and an operating position projecting upwardly and laterally outwardly from the container 25. In the operating position, grain is discharged through a spout 52 pivotally connected to the upper housing 46, as shown in the above '435 and '830 patents. Preferably, a vertical ladder 54 is supported by the tongue 13 and front wall 33 of the container 25 to provide for convenient inspection of the grain within the chamber defined by the container 24.

Figure 2:
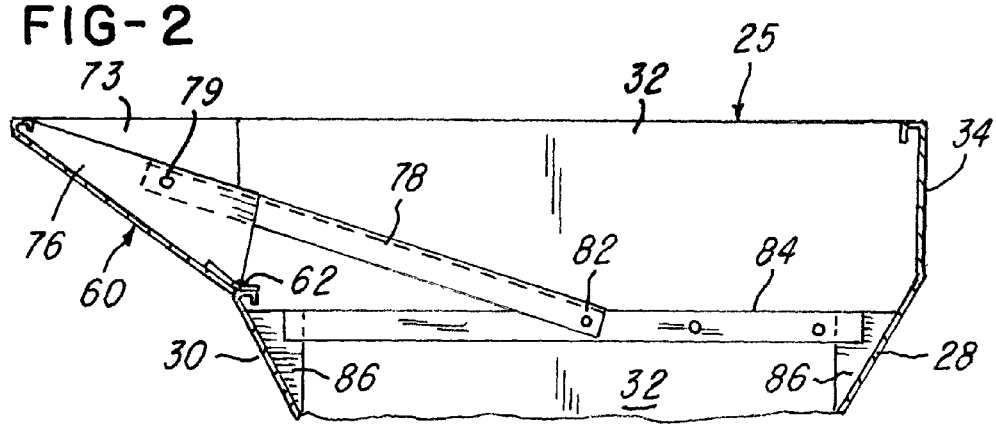
FIG. 2 is a fragmentary vertical section of the cart container taken generally on the line 2-2 of FIG. 1 and showing the right side wall extension panel supported in its inclined extended position.

In accordance with the present invention, the inclined right side wall 30 of the container pivotally supports an elongated right side wall extension panel 60 by a set of hinges 62. The panel 60 extends horizontally between the front wall 33 of the container and to the rear wall 32 of the container and is pivotable to an inclined extended position (FIG. 2) projecting laterally outwardly beyond the right set of wheels 16 at an angle greater than the angle of the inclined right side wall 30, as shown in FIG. 2. Preferably, the extension panel 60 is formed in sections and includes a front panel section 64 and a rear panel section 66 and may have one or more intermediate panel sections 68. Each of the panel sections has upwardly projecting flanges 69 on opposite ends, and adjacent flanges are bolted together so that the extension panel may be pivoted in sections or as a one piece unit. The front panel section 64 is rigidly connected to the front wall 33 of the container 25 by a removable front end panel 71 having a generally triangular configuration, and the rear panel section 66 is rigidly connected to the inclined rear wall 32 of the container by removable end panels 72 and 73 each having a generally triangular configuration.

A set of generally triangular brackets 76 are secured to the elongated extension panel 60 in longitudinally spaced relation, and each bracket is pivotally connected to a corresponding elongated brace member 78 by a pivot bolt 79. Each brace member 78 has an inverted L-shaped cross-sectional configuration, and the inner end portion of each brace member is releasably connected by a bolt 82 to a corresponding elongated horizontal tie member 84 which also has an inverted L-shaped cross-sectional configuration. The opposite end portions of each tie member 84 are secured or welded to corresponding brackets or triangular vertical plates 86 welded to the inclined side walls 28 and 30 of the container 25.

As shown in FIG. 2, the support members 78 and tie members 84 support the right side wall extension panel 60 in its outwardly and upwardly projecting inclined extended position as also shown in FIG. 1. After the extension panel 60 is pivoted to its extended position, the end panels 71, 72 and 73 are attached by suitable bolts. When it is desired to pivot the extension panel 60 to a retracted position, such as shown in FIG. 3, the end panels 71, 72 and 73 are removed, and the bolts 82 are removed. The brace members 78 are then used to pivot the extension panel 60 to a retracted position where each brace member 78 is reconnected to its corresponding tie member 84 by resetting the corresponding bolt 82. If it is desired to pivot the extension panel 60 further inwardly to a retracted position entirely within the container chamber, the brace members 78 are reset further to the right in FIG. 3 on the tie members 84 by relocating the corresponding bolts 82.

From the drawings and the above description, it is apparent that a grain cart constructed in accordance with the invention provides desirable features and advantages. As a primary advantage, by pivoting the extension panel 60 to its inclined extended position as shown in FIG. 2, the container 25 is able to receive grain from an auger projecting from a combine having a wide crop gathering head without the danger of the wheels or tracks 18 colliding with the crop gathering head as the grain cart is pulled alongside the moving combine. In addition, the extension panel 60 in its extended position provides for significantly increasing the capacity of the container 25 to hold more grain, for example an additional fifty bushels. The extension panel 60 may also be pivoted to its retracted position over the inclined right side wall 30 so that the overall width of the grain cart including the wheels 16 does not exceed the desired maximum width of twelve feet. When the extension panel 60 is pivoted to its fully retracted position, it does not increase the overall height of the grain cart which is preferably under thirteen feet for shipping and delivery purposes.

While the form of grain cart herein described constitutes a preferred embodiment of the invention, it is to be understood that the invention is not limited to this precise form, and that changes made therein without departing from the scope and spirit of the invention as defined in the appended claims.

What is claimed is:

1. A grain cart adapted to be pivotally connected to a tow tractor for transferring grain from a combine moving in a field to an open-top trailer, said cart comprising
a frame supported by a set of wheels,
a container supported by said frame and defining a chamber for receiving a volume of grain,
said container including a right side wall and a left side wall each inclined upwardly and laterally outwardly from a bottom wall and connected by a front wall and a rear wall with at least said right side wall and said left side wall converging downwardly to a grain removal zone,
an elongated auger conveyor including a power driven auger within a housing and having a lower section pivotally connected to an upper section with said lower section of said auger conveyor positioned to receive grain from said grain removal zone,
said upper section of said auger conveyor supported for folding movement between a retracted stored position adjacent said container and an operating position projecting upwardly and laterally outwardly from said container,
said container further including an elongated right side wall extension panel pivotally connected to an upper portion of said right side wall substantially below a top edge of an extension of said left side wall,
said extension panel pivotable between a retracted position within said chamber between said front wall and said rear wall and an inclined extended position projecting laterally outwardly and upwardly from said upper portion of said right side wall for directing grain into said chamber,
at least one brace assembly connected to support said extension panel in said inclined extended position,
said brace assembly being movable to provide for supporting said extension panel in said retracted position within said chamber, and said grain cart including end panels releasably connecting opposite end portions of said extension panel to said front wall and said rear wall in said extended position of said extension panel for confining grain received on said extension panel between said end panels.

2. A grain cart as defined in claim 1 wherein said extension panel is pivotally connected to an upper edge portion of said inclined right side wall and projects in said inclined extended position at an inclined angle greater than an inclined angle of said inclined right side wall relative to a vertical reference plane.

3. A grain cart as defined in claim 1 wherein said brace assembly includes a bracket secured to said extension panel, and an elongated brace member pivotally connected to said bracket.

4. A grain cart as defined in claim 3 wherein said brace assembly includes an elongated generally horizontal tie member having opposite end portions connected to said right side wall and said left side wall of said container, and said brace member is connected to said tie member.

5. A grain cart as defined in claim 4 wherein said brace member is adjustably connected to said tie member to provide different positions of said extension panel is in said retracted position.

6. A grain cart as defined in claim 1 wherein said elongated extension panel comprises a set of panel sections releasably connected to provide for pivoting each of said panel sections between said retracted position and said extended position.

7. A grain cart adapted to be pivotally connected to a tow tractor for transferring grain from a combine moving in a field to an open-top trailer, said cart comprising
a frame supported by a set of wheels,
a container supported by said frame and defining a chamber for receiving a volume of grain,
said container including a right side wall and a left side wall each inclined upwardly and laterally outwardly from a bottom wall and connected by a front wall and a rear wall with at least said right side wall and said left side wall converging downwardly to a grain removal zone, an elongated auger conveyor including a power driven auger within a housing and having a lower section pivotally connected to an upper section with said lower section of said auger conveyor positioned to receive grain from said grain removal zone, said upper section of said auger conveyor supported for folding movement between a retracted stored position adjacent said container and an operating position projecting upwardly and laterally outwardly from said container, said container further including an elongated right side wall extension panel pivotally connected to an upper portion of said right side wall substantially below a top edge of an extension of said left side wall, said extension panel pivotable between a retracted position within said chamber between said front wall and said rear wall and an inclined extended position projecting laterally outwardly and upwardly from said upper portion of said right side wall for directing grain into said chamber, a set of parallel spaced brace assemblies within said chamber between said front wall and said rear walls and connected to support said extension panel in said inclined extended position, each of said brace assemblies includes an elongated brace member movable to provide for supporting said extension panel in said retracted position within said chamber, and said grain cart including end panels releasably connecting opposite end portions of said extension panel to said front wall and said rear wall in said extended position of said extension panel for confining grain received on said extension panel between said end panels.

8. A grain cart as defined in claim 7 wherein said extension panel is pivotally connected to an upper edge portion of said inclined right side wall and projects in said inclined extended position at an inclined angle greater than an inclined angle of said inclined right side wall relative to a vertical reference plane.

9. A grain cart as defined in claim 7 wherein each of said brace assemblies include a bracket secured to said extension panel, and said elongated brace member of each of said brace assemblies is pivotally connected to said bracket.

10. A grain cart as defined in claim 9 wherein each of said brace assemblies include an elongated generally horizontal tie member having opposite end portions connected to said right side wall and said left side wall of said container, and each said brace member is connected to the corresponding said tie member.

11. A grain cart as defined in claim 7 wherein said elongated extension panel comprises a set of panel sections releasably connected to provide for pivoting each of said panel sections between said retracted position and said extended position.

* * * * *